March 5, 1968 W. STELZER 3,371,487
DIVIDED MASTER CYLINDER
Filed Aug. 15, 1966 2 Sheets-Sheet 1
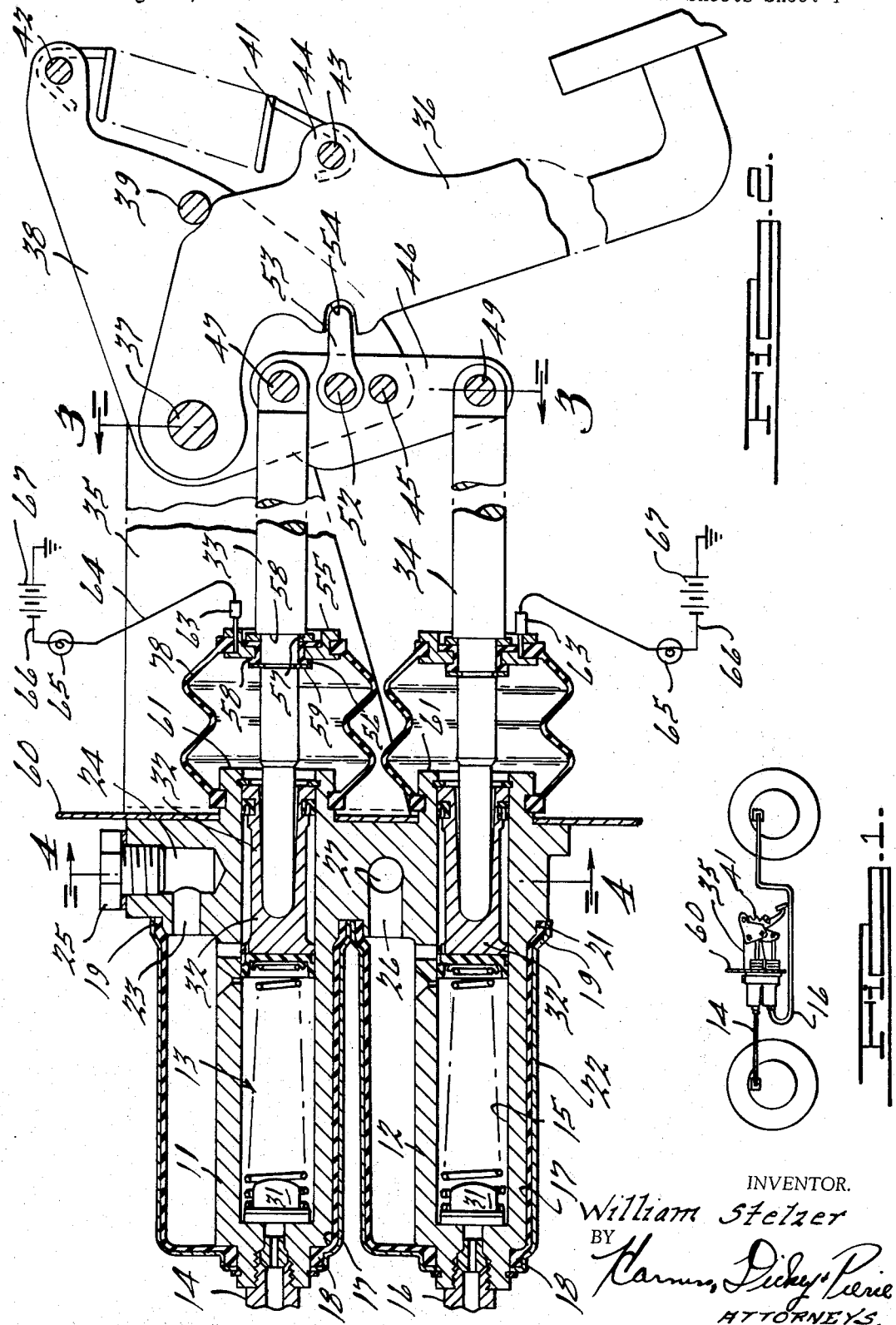
INVENTOR.
William Stelzer
BY
Harness, Dickey & Pierce
ATTORNEYS.

March 5, 1968 W. STELZER 3,371,487
DIVIDED MASTER CYLINDER
Filed Aug. 15, 1966 2 Sheets-Sheet 2
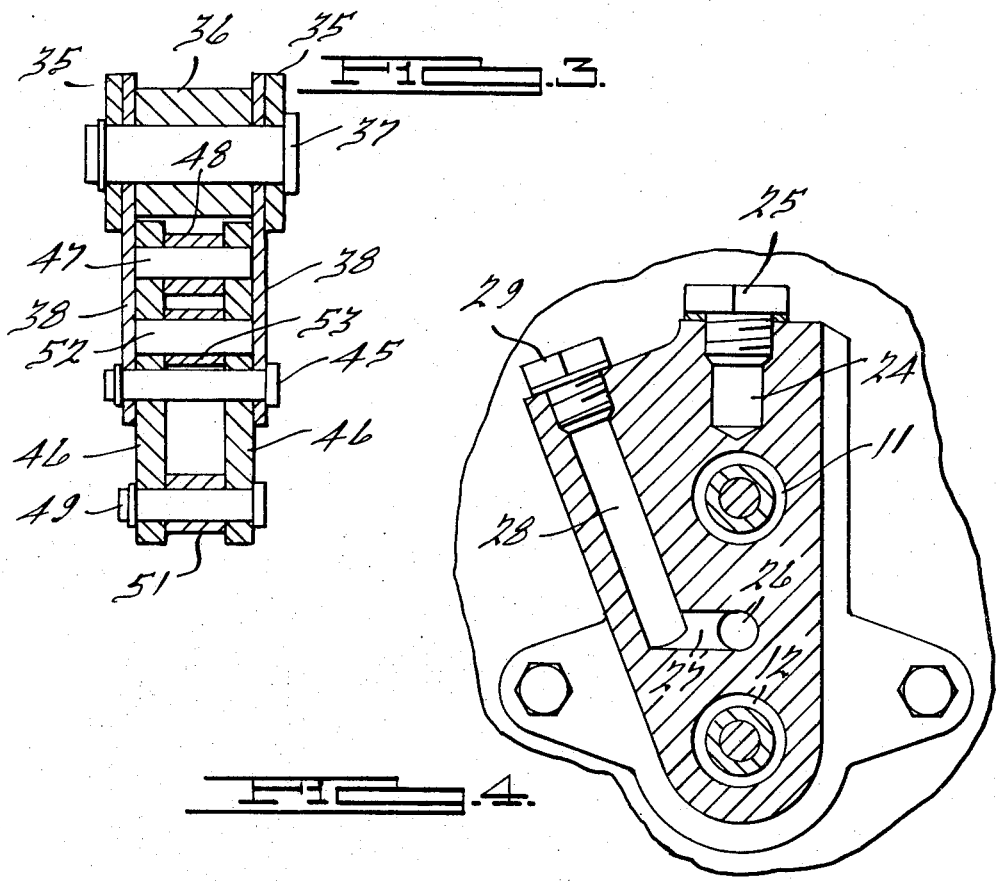
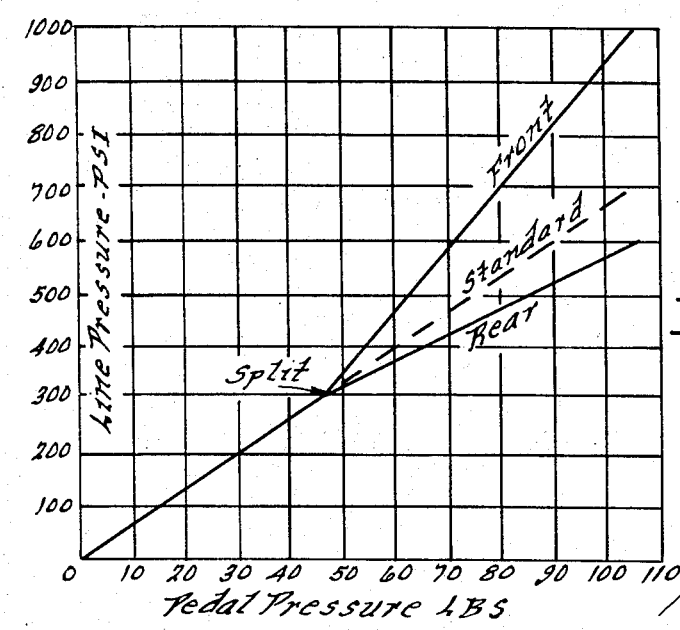
INVENTOR.
William Stelzer.
BY
Harness, Dickey & Pierce
ATTORNEYS.

United States Patent Office 3,371,487
Patented Mar. 5, 1968

3,371,487
DIVIDED MASTER CYLINDER
William Stelzer, Bloomfield Hills, Mich., assignor to Kelsey-Hayes Company, a corporation of Delaware
Filed Aug. 15, 1966, Ser. No. 572,360
12 Claims. (Cl. 60—54.6)

This invention relates to a hydraulic braking system for the wheels of a vehicle, and particularly to the use of a dual master cylinder for dividing the hydraulic braking pressure to proportion the braking action between the front and rear wheel after a given pressure on the brake has been reached.

It was found, upon braking a vehicle suddenly, that the forward weight transfer resulting therefrom, when equal braking pressure was applied to the front and back wheel, that the decreased loading on the back wheels causes the wheels to skid and swing about the loaded front wheels out of the control of the driver. In accordance with the present invention, after a predetermined pressure has been applied to the front and back wheels and the weight impact is shifting from the rear and the concentration of load pressure is on the front wheels, a further braking produces a proportioning of the braking force between the front and rear wheels, applying a greater braking force on the front wheels than on the rear wheels. This compensation for the forward shifting of the weight inertial force to the front of the vehicle prevents the rear wheels from skidding and the vehicle swaying sidewardly to cause the wheels to spin around the front wheel. This proportioning of the pressure after a predetermined pressure has been applied, occurs automatically with the structure of the present invention as the driver is applying a brake load to the foot pedal.

Accordingly, the main objects of the invention are: to decrease the load on the rear wheels as a forward force is increasingly applied to the front wheel as the vehicle is being rapidly decelerated by decreasing the braking force applied to the rear wheels relative to that applied to the front wheel; to actuate a pair of master cylinders through a lever system which, after a certain pressure is reached, applies a greater force to one master cylinder than the other to compensate for the force transfer resulting from the rapid deceleration of the vehicle; to provide a brake pedal lever arrangement for a dual braking system which increases the brake pressure on one pair of wheels over that being applied to the other pair of wheels; to provide a warning signal to apprise the operator of the vehicle when a maximum piston travel has been reached in either one or both of the master cyinders and, in general, to provide a pedal linkage for a dual brake system for proportioning the braking force applied to the front and rear wheels which is simple in construction, positive in operation and economical of manufacture.

Other objects and features of novelty of the invention will be specifically pointed out or will become apparent when referring, for a better understanding of the invention, to the following description taken in conjunction with the accompanying drawing, wherein:

FIGURE 1 is a diagrammatical view of a braking system of the present invention as applied to a vehicle chassis;

FIG. 2 is an enlarged broken sectional view of the structure illustrated in FIG. 1;

FIG. 3 is a sectional view of the structure illustrated in FIG. 2, taken on the line 3—3 thereof;

FIG. 4 is a sectional view of the structure illustrated in FIG. 2, taken on the line 4—4 thereof, and FIG. 5 is a curve showing the application of pressure to the front and rear wheels during the braking of the vehicle.

Many accidents have occurred when driving a vehicle at comparatively high speed and rapidly applying a like brake pressure to the front and rear wheels. The inertia due the speed of the vehicle transfers a weight force forwardly and due to the fact that the engine is usually mounted on the front end of the vehicle, increasing the actual weight thereof over that at the rear wheels, the concentration of forward force on the front wheel and the resulting reduced weight force on the rear wheel causes the rear wheels to move sidewardly and often spin around the front wheels resulting in serious damage to the vehicle and injury to the occupants. The present arrangement employs dual master cylinders for dividing the hydraulic braking pressure applied to the front and rear wheel brakes, proportioning the braking force in accordance with the changing load force on the front and rear wheels. The arrangement is capable of providing an increasing differential pedal pressure after a given pressure is reached.

The master cylinders 11 and 12 are of conventional form, the bore 13 of the master cylinder 11 is connected by a conduit 14 to the brake cylinders of the front wheel while the lower bore 15 is connected by a conduit 16 to the rear wheel cylinders. The reservoir for each of the circuits consists of a cylindrical bladder 17 of elastomeric material secured at one end by an annular sleeve 18 to the cylinders 11 and 12. A sleeve 19 on the opposite end of the bladder is secured in an annular shoulder 21 on the cylinders 11 and 12. The bladders are limited in their outward expansion by a metal closure member 22 which retains the sleeves 18 and 19 in sealed relation to the cylinders. An aperture 23 connects the reservoir of the cylinder 11 to a filler passageway 24 which is closed by a filler plug 25. Aperture 26 communicates the reservoir of the master cylinder 12 with a passageway 27 through a fill passageway 28 normally closed by a filler plug 29. A residual valve 31 of conventional form is provided in the fluid circuit adjacent to the conduits 14 and 16 within the cylinders 11 and 12. The master cylinders have pistons 32 of conventional form, operated by push rods 33 and 34.

A pair of brackets 35 extend forwardly from the master cylinders 11 and 12, the bracket pivotally supports a foot pedal 36 on a pivot pin 37. A pair of plates 38 are also pivoted on the pin 37 between the pedal 36 and the brackets 35, as clearly illustrated in FIG. 3. The plates carry a stop pin 39 which prevents the clockwise rotation of the plates 38 relative to the pedal 36 when urged by a pair of springs 41 supported on the ends of a pin 42 at the upper outer edge of the plates 38 and the ends of a pin 43 supported on a protruding boss 44 of the pedal 36. A pivot pin 45 extends through the plates 38 and support a balancing beam 46 therebetween. The beam comprises a pair of spaced plates as illustrated in FIG. 3. A pin 47 secures an apertured end 48 on the push rod 33 to the upper end of the beam 46 and a pin 49 secures an apertured end 51 on the push rod 34 to the bottom end of the beam 46. It will be noted in this arrangement that the pin 47 is spaced the same distance from the pin 45 as the pin 49 is spaced therefrom which will provide the same initial pressure to the front and rear wheels. A pin 52 connects a link 53 to the beam 46 in position to engage a notch 54 in the foot pedal 36, as clearly illustrated in FIG. 2. There is sufficient clearance between the end of the link and the notch 54 so that normally no force is transmitted between the pedal and the beam through the link 53.

The movement of each push rod 33 and 34 is limited by a metal collar 55, which is insulated therefrom by an insulating washer 56, having a peripheral groove which receives the flange of the collar. The collar abuts a washer 57 which is retained against a shoulder 58 by a split ring 59. The collar 55 is limited in its forward movement when striking the end 61 of the cylinders 11 and 12. The cylinders are grounded to a panel or other supporting element 60. A terminal 63 is conductively joined to each collar 55 and each is connected by a circuit 64 to an indicating device 65 herein illustrated as a lamp bulb 65, a circuit 66 connects the bulb to a current source herein illustrated as a battery 67 which is grounded. Corrugated sealing sleeves 78 of elastomeric material are sealed to the collar 55 and the end 61 of the master cylinders 11 and 12.

When the pedal 36 is moved forwardly to apply the brakes, the pivot 45 is moved therewith by the plates 38 the same as if the plates 38 were a rigid part of the pedal. With the pivot 45 in the center of the beam 46 equidistance from the pins 47 and 49, and with both bores of the cylinders 11 and 12 of the same diameter, the same hydraulic pressure is present in the front and rear brake cylinders. In the example shown, when the hydraulic pressure reaches 300 p.s.i., the springs 41 will yield and the pedal 36 will advance relative to the plates 38 a short distance to take up the clearance with the link 53 and transmit additional force to the beam after the pedal pressure is further increased. The moment about the pivot pin 37 is maintained by the springs 41 and this moment exerts a force on the pivot 45 to maintain a pressure of 300 p.s.i. in the master cylinders 11 and 12. The force transmitted by the link 53 is additional, and since the latter is not in the center of the beam 23, the pressure in the upper master cylinder 11 is increased at a higher rate than that of the lower cylinder 12. Also, the pedal ratio for producing the force transmitted by the link 53 is higher, the pedal ratio being figured by dividing the pedal length by the distance from the pivot 37 to the link 53 whereas, for the initial application of pressure, it was the pedal length divided by the distance from the pivot 37 to the pivot 45. As a result of the later applied force, a higher pressure is produced on the front wheel brake cylinders so that the device acts as a booster. This can be clearly appreciated by examining the graph of FIG. 5 wherein the same pressure was applied to both the front and rear wheels until a line pressure of 300 p.s.i. was reached.

It is to be understood that the distance between the center of the pins 47 and 49 and pin 45 may be varied to initially apply differential pressure between the front and rear wheels, increasing or decreasing one relative to the other. The pedal pressure at this point is approximately 47 pounds. As pointed out above, an increase in pressure stretches the spring 41 and takes up the slack in the link 53 so that as the pedal pressure increases a greater pressure will be applied to the front wheel cylinders than to the rear wheel cylinders. A dot dash line shows the continuation of the same pressure applied to both of the front and rear wheels from which the pressure on the rear wheels is reduced and that on the front wheels is substantially increased. This results from the location of the pin 52 relative to the pins 47 and 49 applying different forces to the push rods. The push rod 33 for the cylinder 11 which applies pressure to the front wheel cylinders being substantially closer to the pivot 52 receives increased pressure as increased force is applied to the pedal beyond the initial force which does not stretch the springs 41. Should the fluid in either the system of the front or back wheels be lost, the collar 55 on the associated push rod 33 or 34 will go forward and engage the metal end 61 of the cylinder in question and complete a circuit to the bulb 65 to thereby warn the operator of the vehicle that the pressure on the fluid has dropped and chances are the fluid has been lost from the system. Since the pressure will be present in the other cylinder the careful application of force to the pdeal will produce the braking for the front or rear wheels so that the progress of the vehicle can be stopped. The use of the simple circuits provides further safety for the brake system.

What is claimed is:

1. In a pressure generating device for a dual master cylinder which is capable of applying differential pressure to the front and rear brake cylinders, a support for a pivot on which a foot pedal is movable, lever means supported on said pivot and engageable with said foot pedal, spring means normally retaining said lever means in engagement with said foot pedal when initial force is applied to the latter, and means actuated when the force applied to the foot pedal is great enough to overcome the spring means for applying a differential pressure to the front and rear brake cylinders.

2. In a pressure generating device as recited in claim 1, wherein the initial force produces equal pressure on the cylinders of both the front and rear brakes.

3. In a pressure generating device as recited in claim 1, wherein the initial force produces unequal pressures on the cylinders of both the front and rear brakes.

4. In a pressure generating device as recited in claim 1, wherein the point of change from normal to differential pressure is controlled by changing the tension of the spring means.

5. In a pressure generating device as recited in claim 1, wherein the lever means is a pair of plates one mounted on each side of the foot pedal carrying stop means which is engageable therewith, a balancing beam carried by the plates on a pivot pin, and a pair of pins on said beam connected to the piston of the master cylinder on opposite sides of said first pin.

6. In a pressure generating device as recited in claim 5, wherein the pivot connecting the beam to the plates may be varied relative to the pins on the beam connected to the push rods for producing different pressures on the front and rear wheel brake cylinders.

7. In a pressure generating device as recited in claim 5, wherein a link pivoted to the beam has a pivotal engagement with the pedal.

8. In a pressure generating device as recited in claim 4, wherein spring means interconnects the lever means and foot pedal prevents the beam from tilting until sufficient force is applied to the foot pedal to tension the spring means.

9. In a pressure generating device as recited in claim 7, wherein after the predetermined initial pressure has been applied on the push rods without tensioning the spring means, a further application of pressure on the foot pedal changes the application of force through the beam to the push rods due to the tensioning of the springs, which applies a differential pressure to the brake cylinders at the front and rear wheels.

10. In a pressure generating device as recited in claim 1, wherein signal means are provided on the master cylinders which indicates when the pressure in either front or rear wheel fluid system has dropped beyond a predetermined pressure.

11. In a hydraulic braking system having a pair of parallel master cylinders to provide separate circuits for the front and rear brakes of an automotive vehicle, push rods operatively connected to said master cylinders, a differential beam having ends engaging said push rods, a brake pedal, first means to transmit a force from said brake pedal to an intermediate point on said differential beam, said first means being yieldable to yield when a predetermined force is reached, and second means arranged to engage said brake pedal with a different intermediate point on said beam responsive to the yielding of said first means to transmit a greater additional force to the one of said master cylinders that is connected to the front brakes and a smaller additional force to the other of said master cylinders.

12. The construction as recited in claim 11, where said second means engages said brake pedal at a point to provide a higher pedal ratio than it has in relation to said first means.

References Cited
UNITED STATES PATENTS 1,733,936  10/1929  Boughton _____ 60—54.6 XR
2,216,124  10/1940  Main _____ 60—54.6

MARTIN P. SCHWADRON, *Primary Examiner.*

ROBERT R. BUNEVICH, *Examiner.*